United States Patent [19]

Neumann et al.

[11] Patent Number: 4,798,948
[45] Date of Patent: Jan. 17, 1989

[54] FIELD STOP FOR DARK FIELD ILLUMINATION IN AUTOFOCUS OPTICAL DEVICE

[75] Inventors: Burkhard Neumann; Hans-Werner Stankewitz, both of Wetzlar, Fed. Rep. of Germany

[73] Assignee: Ernst Leitz Wetzlar GmbH, Wetzlar, Fed. Rep. of Germany

[21] Appl. No.: 39,249

[22] Filed: Apr. 17, 1987

[30] Foreign Application Priority Data

Apr. 30, 1986 [DE] Fed. Rep. of Germany ....... 3614676
May 23, 1986 [DE] Fed. Rep. of Germany ....... 3617421

[51] Int. Cl.$^4$ ................................................ G01J 1/20
[52] U.S. Cl. ................................... 250/201; 250/226; 250/237 R; 356/4
[58] Field of Search ............ 250/201 AF, 226, 237 R; 350/507; 354/403; 356/1, 4

[56] References Cited

U.S. PATENT DOCUMENTS 4,512,642 4/1985 Ito et al. ......................... 250/201 AF
4,595,829 6/1986 Neümann et al. ............ 250/201 AF Primary Examiner—David C. Nelms
Assistant Examiner—Stephone B. Allen
Attorney, Agent, or Firm—Foley & Lardner, Schwartz, Jeffery, Schwaab, Mack, Blumenthal & Evans

[57] ABSTRACT

An optical component is described which can be introduced into a finite or an infinite beam path and which is provided with a spectrally selective filtering characteristic and thus as the same time compensates the thereby generated geometric-optical negative influence by appropriate image-relevant compensation measures. The optical component exhibits at least one optically effective, non-planar surface. It has, for example, the property of completely absorbing visible light and of being completely transparent to shorter- or longer-wavelength light. In addition to this, a laser autofocus arrangement known per se is described, which is equipped with the optical component according to the invention, whereby a dark field illumination with an incident light microscope can be achieved while maintaining the autofocus function.

22 Claims, 1 Drawing Sheet

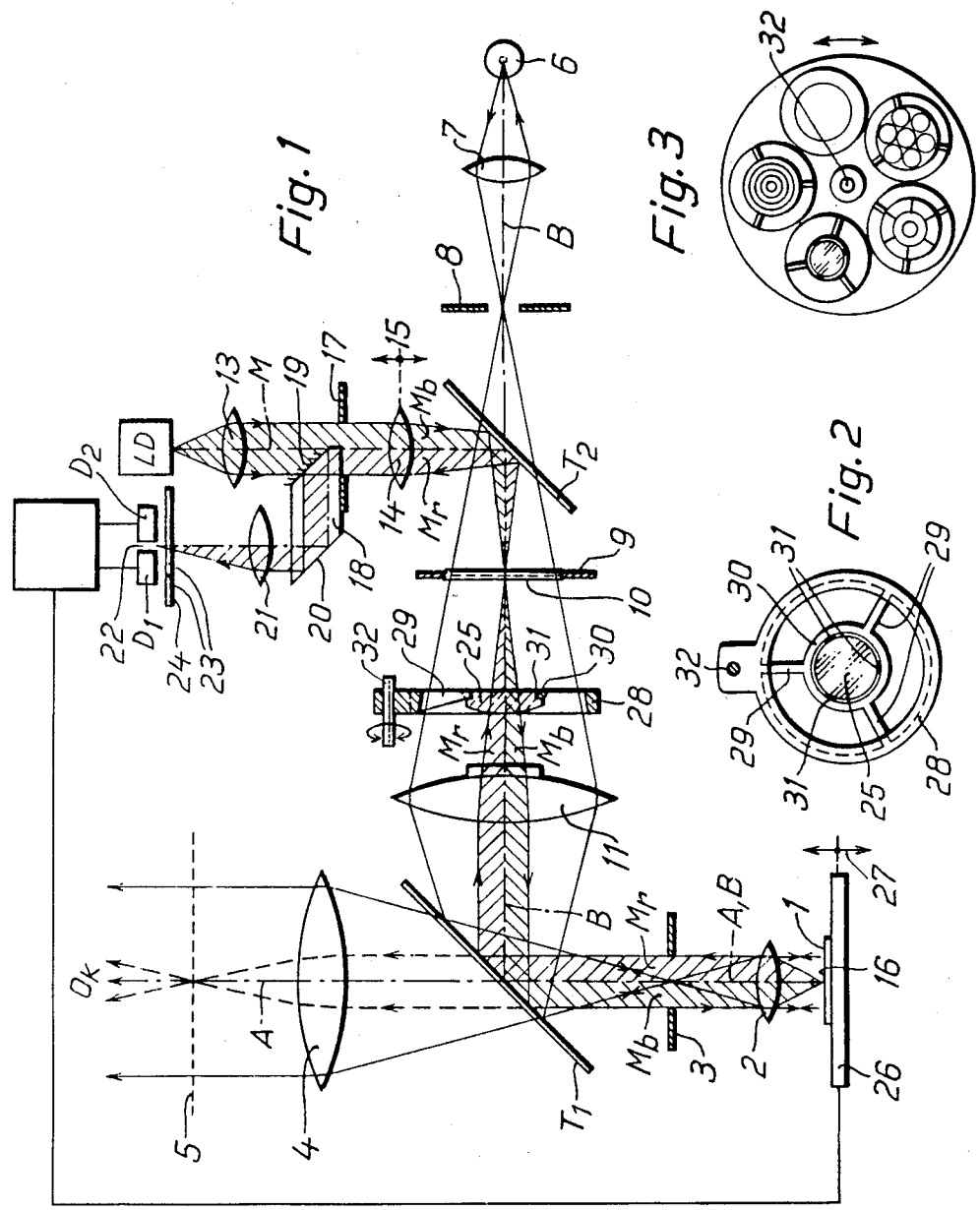

FIELD STOP FOR DARK FIELD ILLUMINATION IN AUTOFOCUS OPTICAL DEVICE

BACKGROUND OF THE INVENTION

The present invention relates to an optical component and to a device for use thereof in an optical device which is provided with an autofocus arrangement and which provides a dark field illumination.

The fundamental mode of operation of a laser autofocus arrangement is knwon from German Pat. No. 3,219,503. With such a device, if it were desired to provide a dark field illumination, it would be necessary to perform circular masking-out of the central region of an illumination beam, for example, by rotating in a customary central stop. However, in such a case the function of the laser autofocus is made ineffective, and moreover the measurement light is likewise masked out.

In order to overcome this disadvantage, it would accordingly be necessary to construct the dark field stop as an infrared filter (IR filter), which absorbs 100% of the visible light, but transmits everything beginning with a wavelength range situated in the near IR. However, such a measure alone would lead to an undesired focussing displacement, since a plane-parallel IR filter plate causes a change in intercept length in the beam path.

SUMMARY OF THE INVENTION

It is accordingly an object of the present invention to provide an optical component which achieves, in combination, a wavelength-dependent transmission or blocking action and at the same time a focus displacement compensation.

A further object of the invention resides in assuring a dark field illumination without impairment or elimination with respect to the actual autofocus function, in the case of a laser autofocus arrangement.

In accomplishing the foregoing objects, there has been provided according to the present invention a one-piece optical component comprising means for placing the component in a working position in a complete beam comprised of at least first and second partial beams, which differ with regard to their respective wavelengths or wavelength ranges in a discrete manner; and means for changing the beam cross-section (converging or diverging), wherein the component transmits light of the first partial beam and blocks light of the second partial beam.

The invention also provides a device embodying the optical component defined above, the device comprising a optical device including an autofocus arrangement for implementing dark field illumination. Preferably the device comprises an incident light microscope having means for automatically focussing on an object to be viewed, the microscope including:

an illumination source for producing an illumination beam path along the optical axis of the microscope; an objective having a focussing plane; an object stage for holding an object to be viewed, the object stage being movable along the optical axis; means, including a laser light source, for generating a separate measurement beam which intersects with the illumination beam path; means, including a dichroic diverter mirror positioned at the intersection of the illumination beam and the measurement beam and a lens positioned between the laser light source and the diverter mirror and being moveable along the axis of the measurement beam, for generating a measurement light point on a surface of the object, this diverter mirror reflecting light from the laser light source and transmitting light from the illumination source; a photo-electric device comprising a differential diode having a gap therein; means for imaging the measurement light point on the photo-electric device to generate a signal indicative of defocussing of the object out of the focussing plane; means, responsive to the signal, for refocussing the microscope to bring the object back into the focussing plane; the measurement light point generating means and the means for imaging the measurement light point including means, positioned between the laser light source and the lens, for geometrically blocking one-half of the measurement beam from the laser light source to produce an incident measurement beam travelling eccentric to the axis of the measurement beam and a corresponding reflected measurement beam travelling eccentric to the axis of the measurement beam, and for diverting out of the measurement beam the reflected measurement beam returning from the object; and means for moving the lens along the measurement beam axis in response to a prescribed offset. In this device, the optical component comprises an infrared filter lens and means for inserting the filter lens into the central region of the illumination beam path on the object side of the diverter mirror.

Further objects, features and advantages of the invention will become apparent from the detailed description of preferred embodiments which follows, when considered together with the attached figures of drawing.

BRIEF DESCRIPTION OF THE DRAWINGS

In the drawings:

FIG. 1 is a schematic partial side elevation (in cross-section) of the beam paths in a reflected light microscope having an autofocus arrangement and the plano-convex optical component according to the invention; and FIG. 2 is a schematic plan view of an IR filter lens according to FIG. 1, held in an individual mounting frame; and FIG. 3 is a schematic plan view of a lens turret arrangement.

DETAILED DESCRIPTION OF THE PREFERRED EMBODIMENTS

According to the invention, an optical component is constructed in one piece and acts in its operative position in a total beam comprising at least two partial beams, which differ with regard to their respective wavelengths or wavelength ranges in a discrete manner, so as to alter the beam cross-section (converging or diverging) and additionally so as to transmit light (transparent) for one of the partial beams and to block light (opaque) for a further partial beam.

In this arrangement, the component exhibits at least one optically effective surface. Advantageously, it is constructed as a filter lens. It is also possible for the optical component to be present as a Fresnel filter lens or as a filter lens array. According to a preferred embodiment of the present invention, the len(es) is (are) constructed as converging lens(es). Advantageously, the optical component exhibits the property that is completely absorbs visible light and is transparent to shorter- or longer-wavelength light, i.e., on the one hand to IR light and on the other hand to UV light.

The invention furthermore provides a device for use of the optical component according to the invention in an optical device which has an autofocus arrangement and provides for dark field illumination.

In such an arrangement, the optical device can be an incident light microscope having a laser autofocus arrangement operating in IR. The arrangement according to the invention can also be designed in such a manner that it relates to a device for automatic focussing on objects to be viewed in optical devices, in particular incident light microscopes. In such an arrangement, a measurement light point is generated on the object surface by means of an eccentrically travelling, separate measurement beam, and by means of the reflected, likewise eccentrically travelling measurement beam, this point is imaged on a photo-electric device after masking or reflecting it out from the illumination-side measurement beam path. When the object plane moves out of the focussing plane of the objective, the signals of the photo-electric device excite a control device, which returns the object plane into the focussing plane. This device includes: a light source for the generation of laser light for the measurement beam; an optical component for the geometric screening of one-half of the illumination-side measurement beam as well as, at the same time, for the geometric masking-out of the reflected measurement beam from the measurement beam path; a lens system, which is displaceable in a defined manner in the axial direction and which includes associated therewith means for the adjustment of the lens as a function of the prescribed offset; a photo-electric device constructed as a differential diode and having a slit diaphragm disposed and oriented in front of the differential diode in such a manner that the slit thereof extends perpendicular to the slit of the differential diode as well as in the direction the imaged laser spot moves, as a function the existing amount of defocussing; and a divider mirror introducing the illumination-side measurement beam into the illumination beam path of the optical device and reflecting the reflected measurement light beam out of the illumination beam path of the optical device. In order to achieve a dark field illumination, the component is constructed as an infrared filter lens and is arranged so as to be insertable into that part of the illumination beam, the central region of which is near to the axis, which travels between a first divider mirror and a second, preferably dichroic divider mirror.

It is preferred to arrange the IR filter lens between a tube lens and a mark provided in the plane of an illumination field stop, preferably a liquid crystal matrix, so as to be slidable in and out. It has proved to be particularly advantageous to construct the infrared filter lens in such a manner that it completely absorbs visible light and exhibits a transparent filter characteristic with effect beginning with a wavelength situated in the near IR range, with maximum transmission being provided at a wavelength of 903 nm. The device can also be designed in such a manner that the IR filter lens is selected or dimensioned with respect to its image-relevant characteristics as well as its material and geometric characteristics in such a manner that a focussing displacement generated by rotating the IR filter lens into the illumination beam is appropriately compensated. In such an arrangement, it is possible for the optical component to be held in an individual mounting, which can be rotated into the beam path by means of a three-point suspension. The three-point suspension can include a ring, which peripherally surrounds the optical component and from which three connecting webs extend to the individual mounting frame. Expediently, the ring and the connecting webs consist of transparent material. Finally, the device can be constructed in such a manner that several of the optical components of the same cross-sectional geometry and differing lens geometry affecting the imaging properties are disposed on a common carrier, slide, turret or the like and can be brought successively into the working position.

The invention is explained in greater detail herein below, with reference to the figures.

A vertically travelling imaging beam A is represented in FIG. 1. Reference numeral 1 designates an object, the surface of which is situated in the focussing plane. The imaging beam A passes initially through an objective lens 2. After leaving the objective pupil 3, the beam A passes through a first dichroic divide mirror (beam splitter) $T_1$ which exhibits in the visible range a 50/50 ratio and in the IR region a high reflection, preferably of about 95%. After passing through a tube lens 4, an image of the object 1 is formed in the intermediate image plane 5. After this, the beam A passes to the eyepiece $O_k$ (not shown).

In the case shown, the illumination beam path of the optical device extends horizontally. From a light source 6, the illumination beam B passes through an aperture stop 8 after leaving an optical system 7. The beam B then passes through a second dichroic beam splitter $T_2$, which exhibits the highest possible transmittance for the visible light coming from the light source 6 and the highest possible reflectance for IR radiation. In the plane of the illumination field aperture 9, there is situated a mark 10, the function of which can remain out of consideration in the present connection. The beam then impinges on a plano-convex IR filter lens 25. This component according to the invention blocks the central region of the beam B coming from the light source 6 and transmits IR light substantially unimpeded. After leaving the lens 11, the illumination beam B impinges on the first dichroic beam splitter $T_1$, from where the reflected components are deflected in the direction toward the object 1.

A light (preferably pulsed) emanates from a laser light source, which is constructed in the illustrated form as a laser diode LD. Preferably, IR measurement light is employed, because it does not have an interfering effect on the microscope image. The measurement light beam M is conducted via a lens 13 and then via a lens 14, which can be displaced in the axial direction according to the double arrow 15, to the dichroic divider mirror $T_2$, which is disposed at the optical intersection of the two beam paths M and B. An image of the laser light source LD is formed in the intermediate image plane in which the illumination field stop 9 is positioned. The aperture stop 8 is motor-adjustable, as is also the illumination field stop 9.

In order that the measurement spot 16 moves when there is defocussing on the surface of the object, one-half of the pupil 17 is covered. The geometric masking of one-half of the measurement light beam M takes place by means of a deflecting prism 18, which is introduced to the extent of one-half into the measurement beam path M at the height of the pupil 17. It includes a fully mirror-coated prism surface 19. The part of the illumination-side measurement light beam which is not obstructed by the arrangement of the deflecting prism 18 is identified in FIG. 1 by a first hatching. The eccentrically extending part of the illumination-side measurement light beam is provided with the reference symbol $M_b$. The measurement light thus passes along $M_b$, i.e., eccentrically and—substantially—parallel to the optical axis of this partial system, into the objective pupil 3.

After reflection at the surface of the object 1, the reflected measurement light beam $M_r$ passes, after reflection at $T_2$, through that half pupil of 17 which is not illuminated by the measurement light beam $M_b$. By means of the fully mirror-coated surface 19 of the deflecting prism 18, it is then reflected out from illumination-side measurement beam path M. After total reflection at the prism surface 20 as well as after passing through an optical system 21, the beam $M_r$ is conducted to the differential diode, which consists of two diodes $D_1$ and $D_2$.

A narrow slit 22 is situated between the two diodes, a slit stop 23 is disposed in front of the differential diode $D_1$, $D_2$. It consists of two stop halves, between which a stop slit 24 is kept free. As is evident, the stop slit 24 extends perpendicular to the diode slit 22. In the case of defocussing, the image of the spot 16 has moved out of the central position which is shown in FIG. 1. Means which are not shown control the object 1 as a function of the displacement of the spot image; more precisely, the object stage 26 is guided in the direction of the double arrow 27 until the focussing condition has been completely restored.

In the intermediate image plane in which the illumination field stop 9 is disposed, there is situated a mark 10, by means of which the position of the invisible measurement spot 16 is determined. This can consist of a sandwich-like double glass plate, which exhibits in its interior two liquid crystal lamellae, which intersect at the center of the plate and which, depending upon the applied voltage, can make the central region of intersection impermeable to the illumination light.

Since the lens 14 can be displaced in a defined manner parallel to the optical axis of the measurement light beam M, additional functions such as "offset" settings and focus differential corrections between infrared and visible light are possible with the device shown.

If the individual mounting frame 28, which indirectly surrounds the IR filter lens 25, is pivoted about the axle 32 out of the total beam, the schematic representation shown in FIG. 1 is in principle known from German Pat. No. 3,219,503. However, only a device for laser autofocus, bright field incident light illumination can be constructed with this previously described arrangement. Incident light dark field illumination is, however, shown in the present FIG. 1.

At this point, the present invention enters into consideration:

If the IR filter lens 25 according to the invention is introduced into the central region of the total beam, then the visible light coming from the light source 6 is absorbed to the extent of 100%, while the IR light coming from the laser light source LD is transmitted without obstruction. The optical component constructed as the plano-convex IR filter lens 25 is dimensioned in such a manner that the visible light passes to the lens system 11 only in the outer region of the beam, then to the first divider mirror $T_1$ and from there to the object 1, which is situated on an object stage 26. On this basis, a dark field illumination is assured, while maintaining the IR laser autofocus function. As a result of the construction of the optical component as an IR filter lens, any focussing displacement which occurs is additionally also automatically compensated.

FIG. 2 shows a plan view of the support for the optical component according to the invention, which can be introduced into the beam path. It is viewed from the direction of the light source 6. The individual mounting frame 28 can be rotated about an axile 32 into the beam path. The IR filter lens 25 is surrounded at a certain spacing by a ring 30, which is held centrally by means of three webs 29 connecting with the outer frame 28. The IR filter lens 25 is connected to the ring 30 at three positions, e.g., the cementing points 31. The ring 30 and the connecting web 29 consist of material which is transparent to visible light. In place of the three-point suspension shown, it is of course also possible to contemplate other designs. In this connection, however, the variation shown in FIG. 2 exhibits the advantage, as compared with other proposals, that the fewest possible supporting connections are present in the outer region of the beam.

In place of an individual suspension for the optical component, it is also possible to employ turrets, linear slides, etc. to receive several IR filter lenses. In this connection, each of the lenses should preferably be designed to act in a substantially similar manner with regard to its IR transmission properties, but differently in each instance with regard to its refractive power. FIG. 3 illustrates a lens turret arrangement which contains a plurality of lens and rotates about centrally located axel 32.

Another arrangement embodying the optical component according to the invention can be designed, for example, in such a manner that the component is completely absorbing for visible light, but transparent to short-wavelength (UV) light. In this manner, a UV fluorescence device may be combined with a dark field arrangement.

Further embodiments pertain to the use of the optical component as an IR Fresnel (filter) lens or as a filter lens array.

The fundamental concept of the present invention entails providing an optical component which can be introduced into a finite or an infinite beam path with a specific spectrally selective filtering characteristic, and thus at the same time compensating the thus-generated geometric-optical negative influence by appropriate image-relevant compensation measures. This concept can be implemented in a multiplicity of further optical arrangements, which are not explained in greater detail here.

What is claimed is:

1. In an incident light optical device capable of dark field illumination and including an incident light beam comprised of at least first and second partial beams which are coextensive in at least a central region of said incident light beam and which differ with regard to their respective wavelengths, or wavelength ranges, said second one of said partial beams comprising an autofocus measurement beam;

a one-piece field stop component, comprising a lens element means for insertion into the central region of the incident light-beam and for changing the beam cross-section (converging and diverging), said lens element means blocking the wavelength of said first partial beam and transmitting the wave length of said second partial beam; and means for selectively interposing said lens element means into the central region of said incident light beam.

2. A field stop as claimed in claim 1, comprising at least one non-planar, optically effective surface.

3. A field stop as claimed in claim 1, comprising a filter lens.

4. A field stop as claimed in claim 1, comprising a Fresnel filter lens.

5. A field stop as claimed in claim 1, comprising a filter lens array.

6. A field stop as claimed in claim 1, wherein said means for changing the beam cross-section comprises a converging lens.

7. A field stop as claimed in claim 1, wherein said second partial beam comprises a laser beam.

8. A field stop as claimed in claim 1, which completely absorbs visible light and is transparent to shorter- or longer-wavelength light.

9. A field stop as claimed in claim 7, wherein the optical device comprises a microscope.

10. A field stop as claimed in claim 8, which is transparent to infrared light.

11. A field stop as claimed in claim 8, which is transparent to ultraviolet light.

12. A device comprising an incident light microscope having means for automatically focussing on an object to be viewed, said microscope including:
   an illumination source for producing an illumination beam path along the optical axis of the microscope;
   an objective having a focussing plane;
   an object stage for holding an object to be viewed, said object stage being movable along the optical axis;
   means, including a laser light source, for generating a separate measurement beam which intersects and is coextensive with said illumination beam path in at least a central region of the illumination beam;
   means, including a dichroic diverter mirror positioned at the intersection of said illumination beam and said measurement beam and a lens positioned between said laser light source and said diverter mirror and being movable along the axis of said measurement beam, for generating a measurement light point on a surface of said object, said diverter mirror reflecting light from said laser light source and transmitting light from said illumination source;
   a photo-electric device comprising a a differential diode having a gap therein;
   means for imaging the measurement light point on said photo-electric device to generate a signal indicative of defocussing of the object out of said focussing plane;
   means, responsive to said signal, for refocussing the microscope to bring the object back into the focussing plane;
   said measurement light point generating means and said means for imaging the measurement light point including means, positioned between said laser light source and said lens, for geometrically blocking one-half of the measurement beam from the laser light source to produce an incident measurement beam travelling eccentric to the axis of the measurement beam and a corresponding reflected measurement beam travelling eccentric to the axis of the measurement beam, and for diverting out of the measurement beam said reflected measurement beam returning from the object;
   means for moving said lens along the measurement beam axis in response to a prescribed offset; and
   an optical component comprising a filter lens and means for inserting said filter lens into the central region of the illumination beam path on the object side of said diverter mirror, said filter lens blocking said illumination beam and transmitting said measurement beam in the central region to provide for dark field illumination.

13. A device as claimed in claim 12, wherein said measurement light point imaging means includes a slit stop positioned in front of said differential diode, said slit stop having a slit which is oriented perpendicular to the gap in said differential diode and in the direction in which the imaged measurement point moves upon defocussing.

14. A device as claimed in claim 12, wherein said refocussing means includes means for moving said object stage along the optical axis.

15. A device as claimed in claim 12, further comprising a tube lens on the object side of said infrared filter lens and a planar illumination field aperture on the opposite side of said infrared filter lens, said field aperture including a marker.

16. A device as claimed in claim 12, wherein the filter lens comprises an infrared filter lens which completely absorbs visible light and, beginning with a wavelength situated in the near IR range, exhibits a transparent filter characteristic, having a maximum transmission at a wavelength of 903 nm.

17. A device as claimed in claim 12, wherein the filter lens is selected or dimensioned with respect to its image-relevant characteristics as well as its material and geometric characteristics, in such a manner that a focussing displacement generated by rotation of the IR filter lens into the illumination beam is appropriately compensated.

18. A device as claimed in claim 12, comprising an individual mounting for the optical component and means for rotating the mounting into the beam path.

19. A device as claimed in claim 12, comprising a plurality of the optical components of the same cross-sectional geometry, but having differing lens geometry for influencing imaging properites, and means for successively bringing the lenses into the working position.

20. A device as claimed in claim 12, wherein said mounting comprises a three-point suspension.

21. A device as claimed in claim 20, wherein the three-point suspension includes a ring peripherally surrounding the optical component and three connecting webs extending from the optical component to the individual mounting frame, and wherein the ring and the connecting webs comprise a transparent material.

22. A device comprising an incident light microscope capable of dark field illumination and having means for automatically focussing on an object to be viewed, said microscope including:
   an illumination source for producing an illumination beam path along the optical axis of the microscope;
   an objective having a focussing plane;
   an object stage for holding an object to be viewed, said object stage being movable along the optical axis;
   means, including a laser light source, for generating a separate measurement beam which intersects and is coextensive with said illumination beam path in at least a central region of the illumination beam;
   means, including a dichroic diverter element positioned at the intersection of said illumination beam and said measurement beam and a lens positioned between said laser light source and said diverter element and being movable along the axis of said measurement beam, for generating a measurement light point on a surface of said object, said diverter element reflecting light from said laser light source and transmitting light from said illumination source;

a photo-electric device;

means for imaging the measurement light point on said photo-electric device to generate a signal indicative of defocussing of the object out of said focussing plane;

means, responsive to said signal, for refocussing the microscope to bring the object back into the focussing plane;

means for moving said lens along the measurement beam axis in response to a prescribed offset; and an optical component comprising a filter lens and means for inserting said filter lens into the central region of the illumination beam path on the object side of said diverter element, said filter lens blocking said illumination beam and transmitting said measurement beam in the central region to provide for dark field illumination.

* * * * *